United States Patent
Schneider et al.

(10) Patent No.: US 8,833,386 B2
(45) Date of Patent: Sep. 16, 2014

(54) COAXIAL VALVE HAVING A SEALING ELEMENT

(75) Inventors: Ewald Schneider, Schoental-Bieringen (DE); Friedrich Menz, Forchtenberg (DE)

(73) Assignee: Ewald Schneider, Schoental-Bieringen (DE)

( * ) Notice: Subject to any disclaimer, the term of this patent is extended or adjusted under 35 U.S.C. 154(b) by 8 days.

(21) Appl. No.: 13/528,626

(22) Filed: Jun. 20, 2012

(65) Prior Publication Data

US 2013/0015386 A1    Jan. 17, 2013

Related U.S. Application Data

(63) Continuation of application No. PCT/EP2010/069935, filed on Dec. 16, 2010.

(30) Foreign Application Priority Data

Dec. 21, 2009 (DE) .......................... 10 2009 060 785
Feb. 19, 2010 (DE) ...................... 20 2010 002 791 U (51) Int. Cl.
| F16K 1/44 | (2006.01) |
| F16K 43/00 | (2006.01) |
| F16K 51/00 | (2006.01) |
| F16K 1/12 | (2006.01) |
| F16K 31/06 | (2006.01) |

(52) U.S. Cl.
CPC ................ *F16K 1/123* (2013.01); *F16K 1/126* (2013.01); *F16K 31/0651* (2013.01)
USPC .. 137/329.05; 251/344; 251/360; 251/129.15

(58) Field of Classification Search
USPC ........ 137/329, 329.01–329.06; 251/344, 357, 251/360, 129.15
See application file for complete search history.

(56) References Cited

U.S. PATENT DOCUMENTS

| 197,133 | A | * | 11/1877 | Hills et al. | ............... | 137/533.13 |
| 953,940 | A | * | 4/1910 | Beam | ........................ | 137/329.02 |

(Continued)

FOREIGN PATENT DOCUMENTS

| CN | 101097000 | 1/2008 |
| DE | 41 25 815 | 2/1993 |
| DE | 199 01 654 | 8/2000 |
| DE | 101 08 492 | 9/2002 |
| DE | 10 2006 010 087 | 9/2007 |
| EP | 0 566 543 | 10/1993 |
| EP | 1 235 012 | 8/2002 |

OTHER PUBLICATIONS

International Search Report for PCT/EP2010/069935, mailed on Apr. 29, 2011.

(Continued)

*Primary Examiner* — Eric Keasel
*Assistant Examiner* — Kevin Barss
(74) *Attorney, Agent, or Firm* — Morrison & Foerster LLP (57) ABSTRACT

A coaxial valve (10) has a valve housing (11) with an inlet port (12) and an outlet port (14) for a medium (15) flowing through the coaxial valve. A control tube is movable in its longitudinal direction in the valve housing (11) and interacts with the inlet port (12) and the outlet port (14) such that with the valve (10) opened medium (15) flows through the control tube. A valve seat within said valve housing has a valve seat face, the control tube interacting with the valve seat face in one of its axial end positions for closing the coaxial valve (10). The valve seat face is formed on a replaceable sealing element (22) which is arranged in an opening (19) of the valve housing (11), said opening (19), running essentially transversely with respect to the longitudinal direction.

17 Claims, 5 Drawing Sheets

(56) References Cited

U.S. PATENT DOCUMENTS

| | | | |
|---|---|---|---|
| 2,688,462 A * | 9/1954 | Barbehenn | 251/225 |
| 3,746,305 A * | 7/1973 | Zakka | 251/360 |
| 4,174,557 A * | 11/1979 | Goto et al. | 29/890.124 |
| 5,217,037 A * | 6/1993 | Bristol | 137/14 |
| 5,829,952 A * | 11/1998 | Shadden | 417/514 |
| 6,357,721 B1 * | 3/2002 | Maurer | 251/129.15 |
| 6,412,750 B1 | 7/2002 | Jun et al. | |
| 6,889,702 B2 * | 5/2005 | Hall et al. | 137/315.41 |

OTHER PUBLICATIONS

International Preliminary Report on Patentability for PCT/EP2010/069935, issued Jun. 26, 2012.

First Office Action (including translation) for CN 201080058601.8, mailed Jun. 20, 2013, 15 pages.

* cited by examiner

COAXIAL VALVE HAVING A SEALING ELEMENT

CROSS-REFERENCE TO RELATED APPLICATIONS

This is a continuation application of copending international patent application PCT/EP 2010/069935, filed Dec. 16, 2010, and designating the United States, which was published in English as WO 2011/080105 A1, and claims priority to German patent application DE 10 2009 060 785.4, filed Dec. 21, 2009, and priority to German utility application DE 20 2010 002 791.8, filed Feb. 19, 2010. The entire contents of these prior applications are incorporated herein by this reference.

BACKGROUND OF THE INVENTION

1. Technical Field

The present invention relates to a coaxial valve comprising a valve housing, on which an inlet port and at least one outlet port for a medium which is to be conducted through the coaxial valve are provided, a control tube which is mounted in the valve housing, said control tube being movable in its longitudinal direction in the valve housing and interacting with the inlet port and the outlet port in such a way that when the coaxial valve is opened medium flows through the control tube, at least one valve seat having a valve seat face, the control tube interacting with the valve seat face in one of its axial end positions in order to close the coaxial valve, and a control device for moving the control tube between its axial end positions.

2. Background Art

Such a co-axial valve is known, for example, from DE 101 08 492 A1.

The known coaxial valves are used to regulate and shut off fluid or gaseous media, wherein these media may be chemically aggressive and may be present at high or low temperatures as well as at high pressures. Against this background, coaxial valves of this kind are subject to stringent requirements in terms of their tightness, mechanical reliability and service-friendliness.

Coaxial valves are used, for example, to supply machine tools with cooling lubricants which are made available by feeding them in at high pressures.

In these applications, the coaxial valves mentioned at the outset are used because they are completely relieved of pressure and the prevailing pressure of the medium to be transported therefore does not have any effect on the switching behaviour. In addition, the medium to be controlled flows through the coaxial valve without appreciable deflection of the flow in the axial direction, wherein the resistance of the coaxial valve to the flowing medium is very low.

Such coaxial valves have a control tube which is mounted in an axially movable fashion in a valve housing and through which the medium to be transported flows. The control tube interacts with a valve seat face on which the control tube rests in one of its axial end positions in such a way that the coaxial valve is closed.

In its opposed axial end position, the control tube is spaced apart from the valve seat face, with the result that the medium can flow freely through the coaxial valve.

As a rule, in coaxial valves of this type a valve spring is provided which prestresses the control tube into the opened position when the coaxial valves are of the type "open in the state of rest (NO=normally open)", and correspondingly into the closed position when the coaxial valves are of the type "closed in the state of rest (NC=normally closed)".

The movement of the control tube between the two end positions is carried out, for example, by means of an electromagnet which, when energized, acts on the control tube connected to an armature in such a way that said control tube is moved from its one coaxial end position into the other coaxial end position.

In addition to these directly controlled coaxial valves, externally controlled coaxial valves are also known in which the control valve acts as a piston rod which is connected to a piston which is activated via a control medium which is different from the medium to be switched. This control medium may be, for example, compressed air or hydraulic oil.

The control of the coaxial valves can be double-acting, with the result that the control tube is moved actively both into its closed position and into its open position. In the case of an externally controlled coaxial valve this means that the external medium can be applied to the piston on both of its sides. One of these movements can be assisted by the valve spring, although it is also known to construct coaxial valves without any valve spring.

Coaxial valves are as a rule available as 2/2-way valves or as 3/2-way valves that is to say with two or three external ports, but always with two operating positions.

The coaxial valve which is known from DE 101 08 492 A1 is a 3/2-way valve in which a valve seat with a valve seat face is provided at both ends of the control tube.

DE 10 2006 010 087 B4 discloses a 2/2-way valve in which the valve seat has a solid sphere which is secured in a press fit on a housing upper part of the valve housing. The solid sphere may be taken off together with the entire housing upper part.

All the coaxial valves described thus far have in common the fact that a front-side end of the sleeve-shaped control tube forms an annular face which rests on the valve seat face in the closed state of the coaxial valve.

The valve seat itself is provided with breakthroughs or surrounding openings or spaces through which the medium which flows out of the control tube passes to the outlet port in the opened state of the valve.

DE 101 08 492 A1 discloses that the valve seat face is not embodied as a planar face but rather as a cone envelope surface or a spherical surface.

Owing to the loading conditions during use, it can be observed again and again that dirt collects on the valve seat and both prevents secure closing of the valve and adversely affects the free flow of the medium through the opened valve.

For this purpose, known coaxial valves can be disassembled in order to be able to take off the valve seat and clean it.

In the coaxial valves described thus far, it is possible, for this purpose, to release part of the valve housing in the longitudinal direction of the control tube, that is to say in the direction of the flow of fluid, and to take it off, after which the valve seat face can then be cleaned, or the valve seat in its entirety can be replaced.

It has now become apparent that owing to the geometric conditions this axial removal of the valve seat is frequently problematic. Before disassembly of the valve housing becomes possible, the valve housing itself often must firstly be removed from the machine on which it is mounted.

However, the cleaning of the valve seat faces which is then possible sometimes does not lead to the desired success, with the result that the valve seat in its entirety has to be replaced. For this purpose, the valve seat has to be unscrewed from the housing part previously removed from the valve housing, and a new valve seat has to be screwed on, after which the housing part is then screwed onto the valve housing again, and said valve housing has to be mounted again on the machine which is controlled via the coaxial valve.

These measures overall are time-consuming, with the result that the downtimes which they entail for the controlled machines constitute, together with the cost of the replacement parts, a considerable cost burden.

DISCLOSURE OF THE INVENTION

In view of the above, it is an object of the present invention to make available a coaxial valve of the type mentioned at the outset which has a structurally simple design and in which the maintenance arising from clogged or dirty valve seat faces is simplified and the overall downtimes can be reduced.

In the coaxial valve mentioned in the outset, this and other objects are achieved according to the invention in that the valve seat face is formed on a replaceable sealing element which is arranged in an opening of the valve housing, said opening running essentially transversely with respect to the longitudinal direction.

The objects underlying the invention based are achieved completely in this way.

The inventors of the present application have in fact realized that it is not necessary to remove the entire valve seat together with part of the housing for the purpose of cleaning but rather that it is possible to configure a sealing element in such a way that it can, as it were, be removed from the valve housing in the transverse direction with respect to the direction of flow of the medium to be transported, and after the cleaning can also be inserted again in this way. For this purpose, the replaceable sealing element is arranged in an opening in the valve housing, which opening runs essentially transversely with respect to the longitudinal direction of the control tube.

"Essentially transversely" is understood within the scope of the present application to mean an orientation which preferably runs perpendicularly, that is to say at a right angle, with respect to the longitudinal direction, but may also run obliquely, that is to say at an angle of less than 90°, but above 45°, with respect to the longitudinal axis.

Because the entire valve seat no longer needs to be disassembled now for cleaning the coaxial valve, the handling can be carried out considerably more easily, wherein the cleaning of a single sealing element also occurs very much more quickly and effectively than in the case of an entire valve seat.

Furthermore, after the sealing element has been removed, the flow path in the valve housing can also be quickly and easily cleaned because a lateral access to the region of the valve seat has been produced by the opening. Through this opening it is also possible to clean that end face of the control tube which interacts with the valve seat face.

In other words, the valve seat face is now provided on a sealing element which can be removed laterally from the valve seat and which is not only easy to remove and to clean but can also be manufactured as an economic mass-produced part which can be replaced without high cost. On the other hand, the sealing element can be fabricated with high precision and dimensional accuracy since it has a simple geometric shape.

According to one object the sealing element is secured to a sealing element holder which is attached to the valve housing in a releasable fashion, wherein the sealing element is preferably seated on a supporting bolt which is arranged in the opening and is secured in a releasable fashion at its one end to the valve housing and is attached at its other end to the sealing element holder.

These measures are structurally advantageous; on the one hand the sealing element holder supports the sealing element, but on the other hand it also simultaneously ensures that the opening provided in the valve housing is closed off in the outward direction, with the result that no medium can escape from the valve housing when the valve is opened.

If the sealing element is arranged on a supporting bolt, it is also advantageous that the sealing element is easily statically supported in the opening and protected against bending. In this way it is ensured that in the closed state of the coaxial valve in which the control tube bears with its end face against the valve seat face on the sealing element, the sealing element is not moved or bent. In other words, the supporting bolt, which is supported at its free end on, for example, the base of the opening in the valve housing, and at its other end it is securely connected to the sealing element holder, ensures precise and secure positioning of the sealing element in front of the control tube.

According to another object the sealing element is embodied in a rotationally symmetrical fashion with respect to a sealing element axis, wherein at least two valve seat faces are preferably provided on the sealing element, distributed circumferentially around the sealing element axis.

With this measure it is advantageous that by simply rotating the sealing element around the sealing element axis a different region of the surface of the sealing element is made available as a valve seat face. In other words, if the valve seat face used is so irremediably contaminated that it can no longer be cleaned, the sealing element does not have to be replaced and instead is rotated around the sealing element axis to such an extent that a new surface region is available as a valve seat face.

These measures are patentable per se that is to say without the arrangement of the sealing element in an opening running essentially transversely with respect to the longitudinal direction.

In view of the above, the present invention also relates to a coaxial valve of the type mentioned at the outset, in which the valve seat face is embodied on a replaceable sealing element on which at least two valve seat faces are provided distributed circumferentially around a sealing element axis.

In this way, not only is it possible to service the new coaxial valve very quickly and easily, said coaxial valve is also of very simple structural design and permits, as it were, multiple re-use of the sealing element, with the result that not only the servicing costs but also the replacement part costs are significantly reduced compared to the known coaxial valves.

Depending on the diameter of the sealing element and the diameter of the control tube, three, four, five or even six valve seat faces can therefore also be provided distributed circumferentially around a sealing element, which makes correspondingly frequent re-use of the sealing element possible.

In view of the above, the present invention also relates to a replaceable sealing element, which has at least one valve seat face and is embodied in such a way that it can be mounted in a releasable fashion in a valve housing of the coaxial valve, wherein it can preferably be secured to the valve housing via a supporting bolt, wherein it also preferably has an opening with which it can be plugged onto the supporting bolt.

The supporting bolt may be embodied here on the sealing element itself, with the result that this supporting bolt is plugged into a drilled hole in the valve housing in order to support the sealing element in the valve housing. The supporting bolt can also be provided on the valve housing or on a sealing element holder, wherein the sealing element is then provided with an opening which is fitted onto the supporting bolt.

According to one object at least one positioning arrangement, which secures at least two circumferential orientations of the sealing element in the valve housing, is provided between the valve housing and the sealing element.

With this measure it is advantageous that the angular orientation of the sealing element in the valve housing is defined from the outset so that there is no risk of the sealing element not having been turned far enough to disengage the contaminated valve seat face from the control tube. In addition, the positioning arrangement ensures that the available surface of the sealing element is utilized in an optimum way, that is to say the sealing element is not turned too far if a contaminated valve seat face is moved out of the region of the seal by turning the sealing element.

This positioning arrangement can be arranged between the sealing element and the valve housing, the sealing element and the sealing element holder or the sealing element holder and the valve housing. It is important here that after the removal of the sealing element holder from the valve housing, the sealing element which is still seated on the sealing element holder is rotated precisely so far that a new valve seat face is made available for interaction with the control tube, and said sealing element is then locked again.

According to a further object the positioning arrangement comprises an alignment pin which is secured seated at its one end in a first drilled hole and at its other end interacts with second drilled holes which are arranged distributed around the sealing element axis.

The second drilled holes are provided here spaced apart from one another circumferentially in the same way as effective valve seat faces on the surface of the sealing element.

The second drilled holes can be provided on the sealing element, on the sealing element holder or on the valve housing, wherein the second drill holes are preferably provided on the sealing element, and the alignment pin is seated on the inside of the sealing element holder.

When the coaxial valve according to the invention is contaminated, the sealing element holder must then be merely released from the valve housing and pulled out, together with the sealing element, from the opening in the valve housing. Then, the sealing element is cleaned, and if the previously used valve seat face can no longer be used said sealing element is removed from the sealing element holder on the supporting bolt until the alignment pin disengages from the second drilled holes. The sealing element is then rotated so far until the next of the second drilled holes is located opposite the alignment pin, after which the sealing element is completely fitted on to the supporting bolt again. The sealing element holder with the sealing element at the front is then fitted onto the opening again, and then screwed to the valve housing.

As a result of these simple measures, a new valve seat face is now available for interaction with the control tube without the sealing element itself having to be replaced.

It is also preferred here if the valve seat face, or each valve seat face, is formed on a cylindrical face, a spherical face, a conical envelope face or a planar face of the sealing element.

These different forms of the valve seat face have their respective particular advantages, but are known per se from the prior art.

It is generally also preferred if a valve spring is provided which prestresses the control tube in one of its axial end positions.

With this measure, it is advantageous that in the state of rest the coaxial valve is either permanently opened or permanently closed, without electromagnetic energy or an external medium having to be present.

In this context, the control device can, on the one hand, comprise an electromagnet, wherein the control tube is then connected to an armature of the electromagnet, or else said control device can comprise a piston which is activated via a control medium and to which the control tube is secured in the manner of a piston rod.

These measures are also known per se and they give rise to directly controlled or externally controlled variants of the coaxial valve.

Merely for the sake of completeness it will also be mentioned in conclusion that the new coaxial valves can also be arranged in a block to form multiple modules, wherein the inlet ports and/or outlet ports can be connected to common fluid distributors.

Particularly this arrangement in a block highlights the particular advantages of the new coaxial valve because the respective sealing element can now be removed laterally from the respective valve housing, cleaned, if appropriate turned or replaced, and then inserted again without the complete valve housing having to be disassembled. It is also not necessary for the valve housings to be removed from the arrangement in a block before the valve seat face can be cleaned or replaced.

Further advantages emerge from the description and the appended drawing.

Of course, the features mentioned above and those features that are still to be explained below can be used not only in the respectively specified combination but also in other combinations or alone without departing from the scope of the present invention.

BRIEF DESCRIPTION OF THE DRAWINGS

Embodiments of the invention are illustrated in the drawing and will be explained in more detail in the following description.

MODES OF CARRYING OUT THE INVENTION

Figure 1:
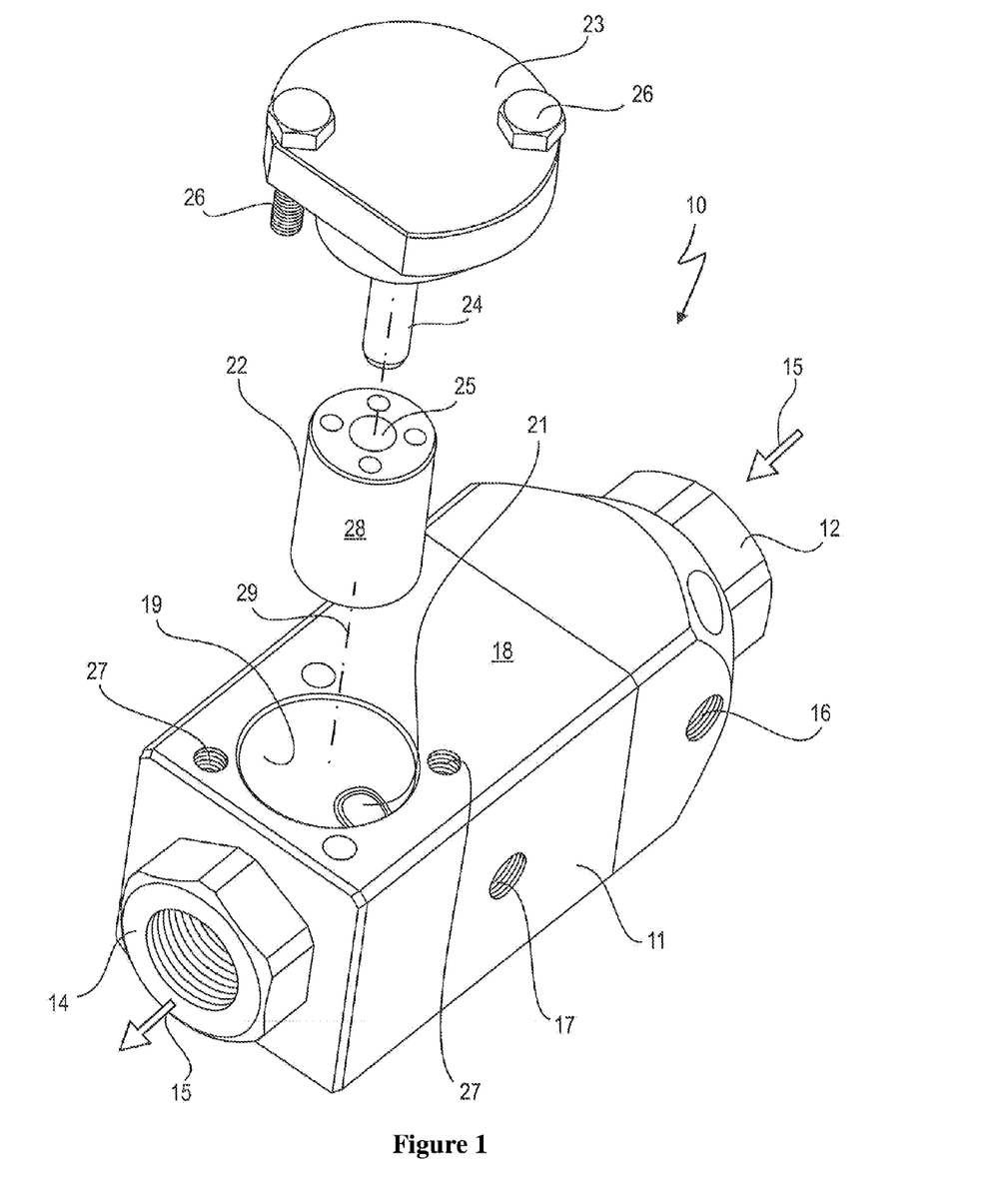
FIG. 1 shows a perspective view of the new coaxial valve with a removed sealing element holder and removed sealing element.

FIG. 1 shows a coaxial valve 10 with a valve housing 11 in a perspective illustration from above in a schematic form and not to scale, on which valve housing 11 an inlet port 12 and an outlet port 14 are provided for a medium which is to be conducted through the coaxial valve 10 and which is symbolized by arrows 15.

Inlet port 12 and Outlet port 14 are embodied as screw connections by means of which the coaxial valve 10 can be connected to distributor pipes for the medium 15, wherein a plurality of coaxial valves 10 can be arranged one next to the other and therefore "arranged in a block", as is generally known from the prior art.

Provided laterally on the valve housing 11 are a first control port 16 and a second control port 17, via which control medium is conducted into the interior of the valve housing 11, in a way which will be described below, in order to open or close the coaxial valve 10.

The valve housing 11 has, on its upper side 18, an opening 19 which runs transversely with respect to the direction of flow of the medium 15 between the inlet port 12 and the outlet port 14.

A front-side end 21 of a control tube is illustrated at the bottom in the opening 19, which control tube cannot be seen further in FIG. 1 and which enters into abutment with a sealing element 22 in the closed state of the coaxial valve 10, which sealing element 22 is shown above the opening 19.

Above the sealing element 22, a sealing element holder 23 is provided from which a supporting bolt 24 protrudes downwards, onto which supporting bolt 24 the sealing element 22 can be fitted with its through-opening 25.

When the sealing element 22 and the sealing element holder 23 are mounted on the valve housing 11, the sealing element 22 is firstly fitted onto the supporting bolt 24. The sealing element 22 is then introduced into the opening 19, as a result of which the sealing element holder 23 comes to rest on the upper side 18 of the valve housing 11. The sealing element holder 23 is then attached by screws 26 to the valve housing 11, for which purpose threaded drilled holes 27 are provided in the upper side 18.

Even if the coaxial valve 10 is now arranged with further coaxial valves 10 in a block at the inlet port 12 of said coaxial valve 10 and/or at the outlet port 14 thereof, and is connected to common media lines, the sealing element 22 can still be removed at any time and cleaned and, if appropriate, replaced. All that is required for this is for the screws 26 to be loosened and the sealing element holder 23 to be pulled off from the valve housing 11 with the sealing element 22 which is supported by said sealing element holder 23.

The sealing element 22 can then be taken down from the supporting bolt 24 and cleaned. It is equally possible to clean the interior of the valve housing 11, in particular the front-side end 21 of the control tube (not illustrated in FIG. 1) through the opening 19. Likewise, the flow through in the outlet port 14 can also be easily cleaned without the outlet port 14 having to be disassembled again.

After the sealing element 22 has been cleaned and, if appropriate, replaced, it is fitted onto the supporting bolt 24 again and then mounted in or on the valve housing 11 together with the sealing element holder 23, in the way already described.

The sealing element 22 according to FIG. 1 can be plugged onto the supporting bolt 24 with different angular orientations, with the result that different regions of its lateral face 28 are available as a valve seat face for the front-side end 21.

In FIG. 1, 29 denotes a sealing element axis which represents the axis of symmetry of the rotationally symmetrical sealing element 22, which is embodied in the form of a cylinder in the embodiment shown. Sealing element 22 is pulled out of the valve housing 11 and inserted therein again in the direction of the sealing element axis 29.

Figure 2:
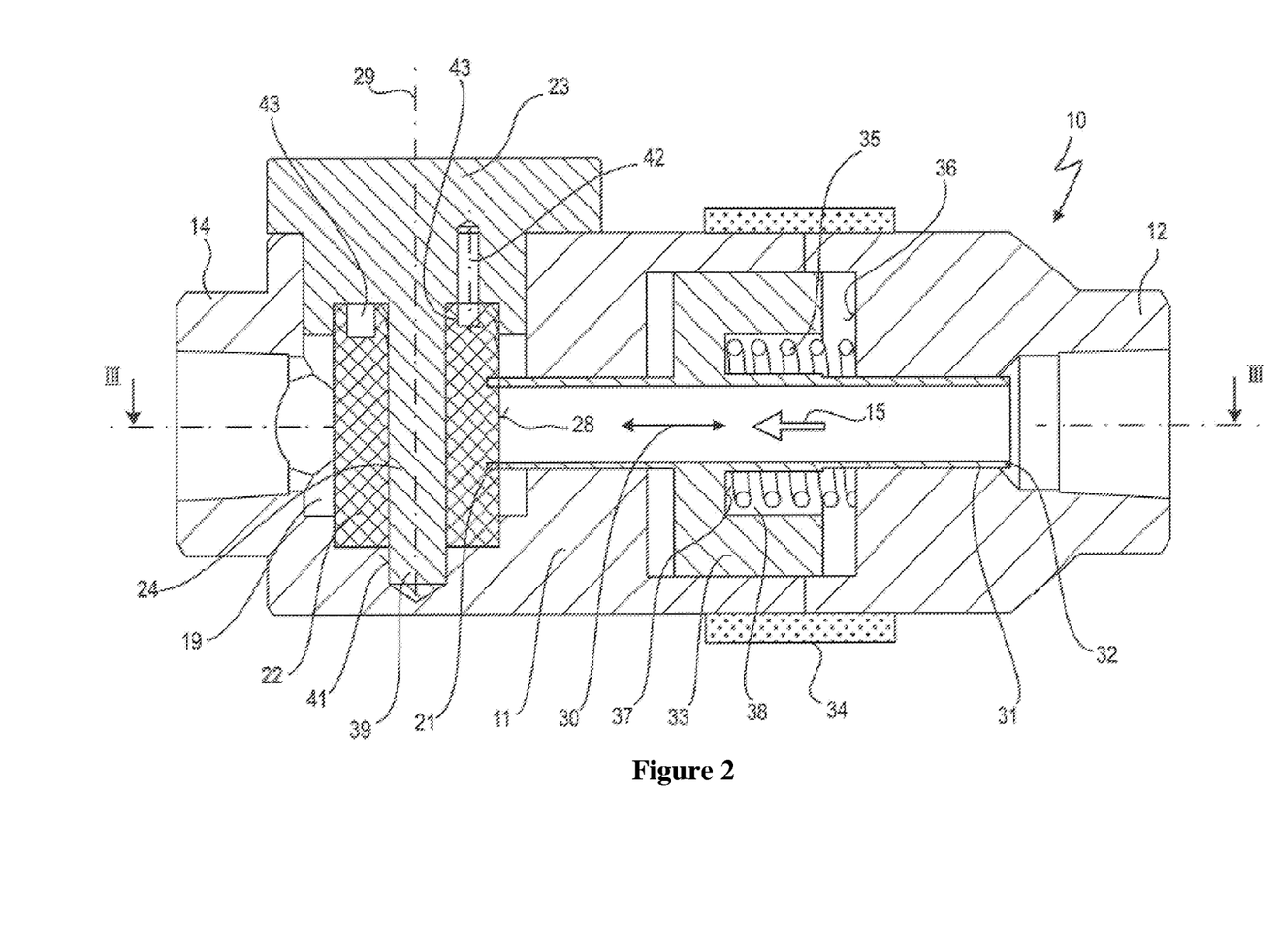
FIG. 2 shows a highly schematic longitudinal section through the valve housing from FIG. 1, viewed along the line II-II in FIG. 3.
Figure 3:
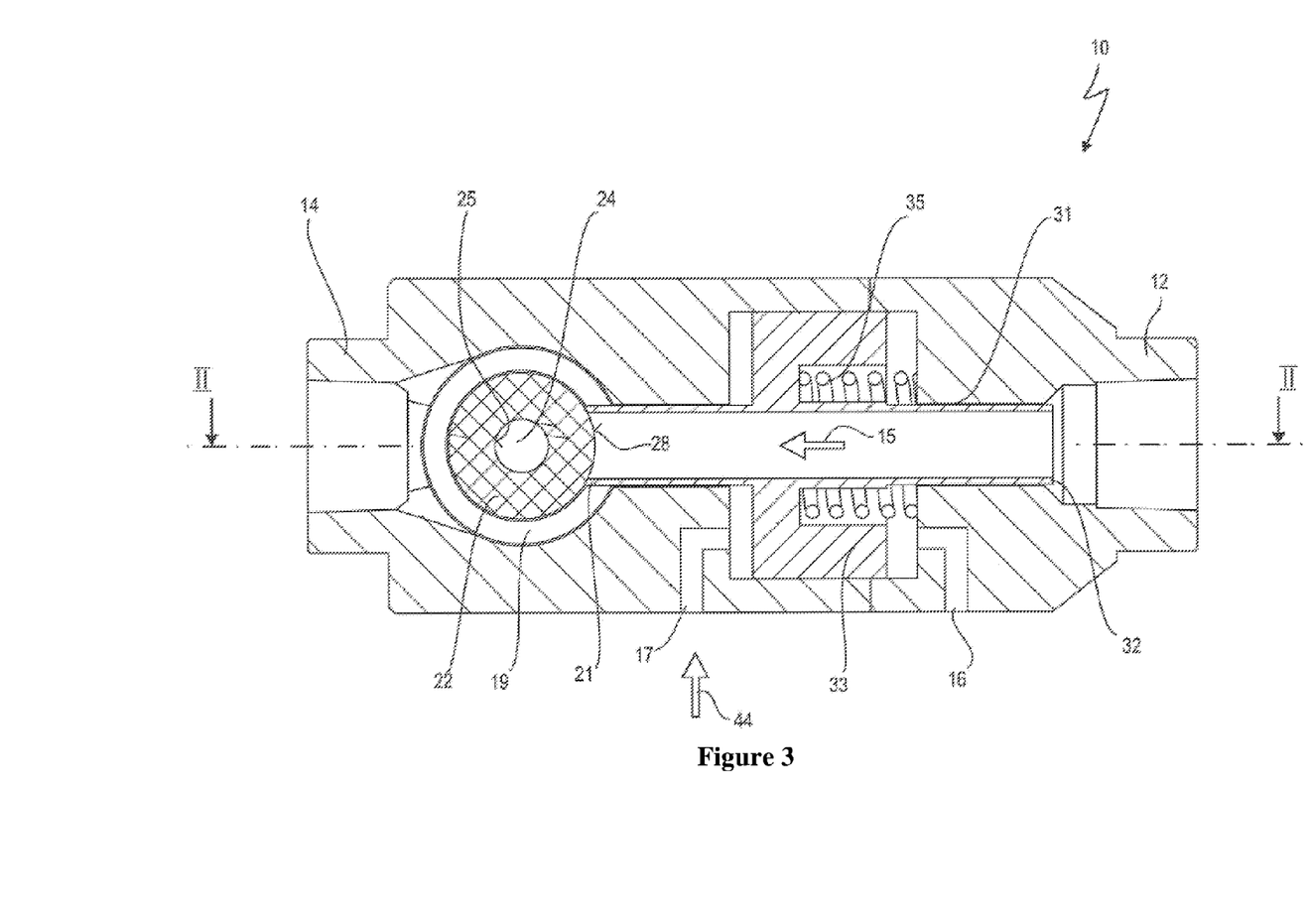
FIG. 3 shows a highly schematic longitudinal section through the valve housing from FIG. 1, viewed along the line III-III in FIG. 2.

FIG. 2 shows a highly schematic longitudinal section through the coaxial valve 10 from FIG. 1, viewed along the line II-II in FIG. 3, which in turn represents a schematic longitudinal section along the line III-III in FIG. 2.

In other words, FIG. 3 illustrates a longitudinal section parallel to the upper side 18, while FIG. 2 shows a longitudinal section in the transverse direction with respect to the upper side 18, that is to say parallel to one of the two side faces of the valve housing 11.

Figure 4:
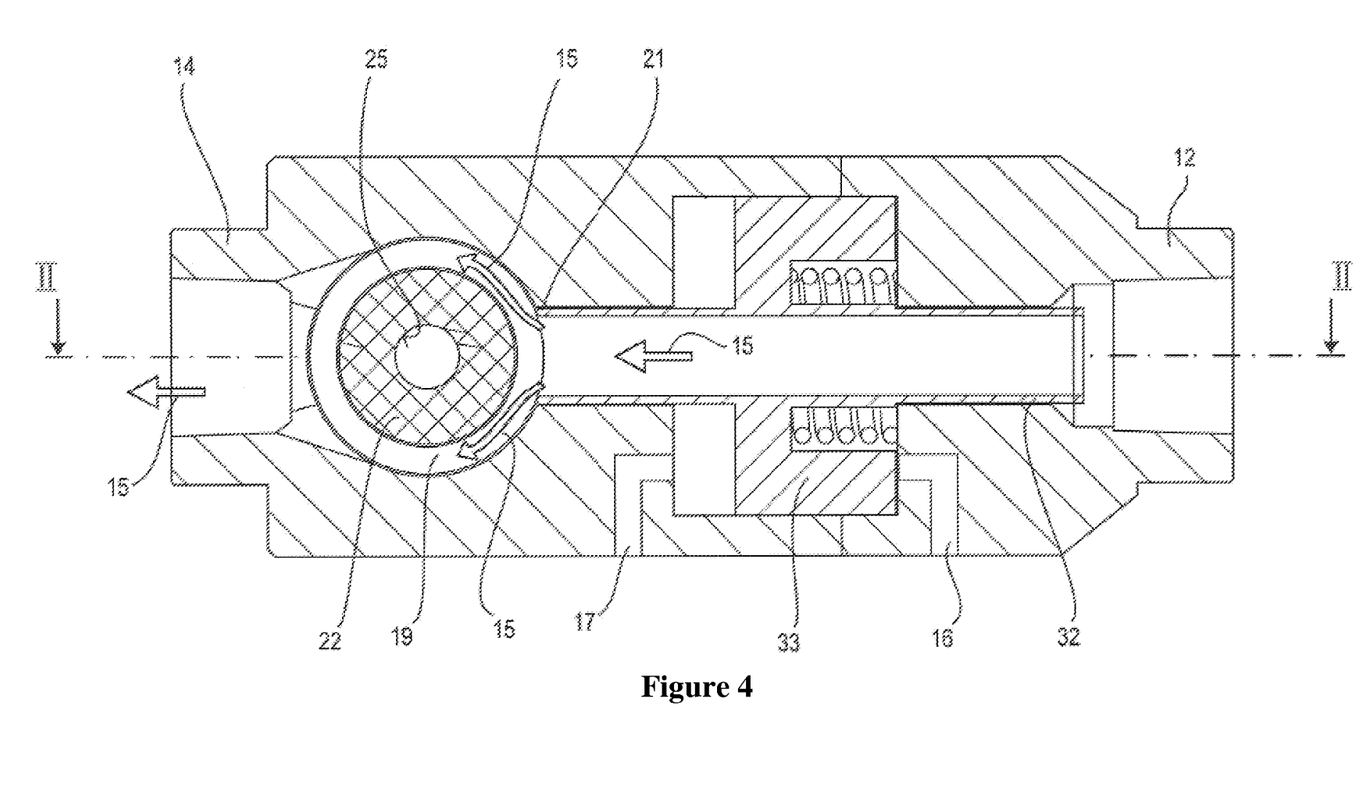
FIG. 4 shows an illustration as in FIG. 3 but with the coaxial valve opened.

The sectional illustrations of FIGS. 2 to 4 are very schematic; they merely show the essential elements of the coaxial valve 10.

In FIG. 2 it is firstly apparent that a control tube 31, already mentioned in conjunction with FIG. 1, is mounted so as to be slidable in a longitudinal direction 30 in the valve housing 11. This control tube 31 extends from the inlet port 12 to the sealing element 22 and carries the medium 15. In the closed position (shown in FIG. 2) of the coaxial valve 10, the control tube 31 rests with its front-side end 21 on the lateral face 28 of the sealing element 22. At its other end 32, the control tube 31 is connected to the inlet port 12.

A piston 33, which serves as an armature for an electromagnet 34 in the embodiment in FIG. 2, is provided on the control tube 31, which is embodied as a sleeve.

A valve spring 35, which is supported at one end on an inner end side 36 of the valve housing 11 and at the other end on an end side 37 in a blind drilled hole 38 in the piston 33, is also arranged in the valve housing 11. In this way, the valve spring 35 presses the piston 33 in FIG. 2 to the left that is to say into the closed position of the coaxial valve 10.

In this position, the front-side end 21 of the control tube 31 rests on the lateral face 28 of the sealing element 22 in such a way that medium 15 cannot escape from the control tube 31.

If current is now applied to the electromagnet 34, it attracts the piston 33, acting as an armature, in FIG. 2 to the right in the longitudinal direction 30 for 3 to 5 mm counter to the force of the valve spring 35, with the result that the front-side end 21 of the control tube 31 lifts off from the lateral face 28 of the sealing element 22.

Medium 15 can now flow into the opening 19 and from there to the outlet port 14.

In FIG. 2 it is also apparent that the supporting bolt 24 which supports the sealing element 22 is plugged, by its free end 39, into a blind drilled hole 41 in the valve housing 11. In this way, the supporting bolt 24 is secured in a releasable fashion to the valve housing 11. Since the supporting bolt 24 is securely connected at one end to the sealing element holder 23, it supports the sealing element 22, when the sealing element holder 23 is screwed onto the valve housing 11, in such a way that even under strong pressure from the medium 15 it does not bend but rather remains in its position in which it reliably interacts with the front-side end 21 of the control tube 31.

As already mentioned, the cylindrical sealing element 22 is embodied in a rotationally symmetrical fashion with respect to the sealing element axis 29, with the result that it can be plugged onto the supporting bolt 24 in any desired angular position around the sealing element axis 29.

In this way it is possible, after the disassembly of the sealing element 22, to rotate the latter through a certain angular range on the supporting bolt 24, with the result that a new region of its surface 28 interacts with the front-side end 21 of the control tube 31 when the sealing element 22 has been mounted again in the valve housing 11.

In order to be able to utilize the surface 28 of the sealing element 22 in an optimum way, a positioning arrangement is provided between the valve housing 11 and the sealing element 22, which positioning arrangement is formed by an alignment pin 42 which is securely seated in a first drilled hole in the sealing element holder 23 and can optionally engage in second drilled holes 43 in the sealing element 22. The distribution of the second drilled holes 43 in the sealing element 22 around the sealing element axis 29 therefore determines those various regions of the lateral face 28 which can interact as a valve seat face with the front-side end 21.

FIG. 3 illustrates the coaxial valve 10 from FIG. 1 in a section parallel to the upper side 18.

In the coaxial valve 10 from FIG. 3, a control medium 44, which can optionally be conducted into the valve housing 11 via the control ports 16 or 17, is now provided, instead of the electromagnet 34, as a control device for moving the piston 33.

If a control medium 44 is conducted into the first control port 16, said control medium 44 presses the piston 33 to the left and closes the coaxial valve 10, assisted by the valve spring 35, by the control tube 31 being pressed by its front-side end 21 onto the valve seat face, formed by the lateral face 28, of the sealing element 22.

If, in contrast, control medium 44 is conducted into the interior of the valve housing 11 through the second control port 17, the coaxial valve 10 is thus opened, and the piston 33 is therefore moved to the right in FIG. 3, counter to the force of the valve spring 35, with the result that the front-side end 21 disengages from the lateral face 28.

The medium 15 can now pass from the control tube 31 into the opening 19 and from there to the outlet port 14.

This state is illustrated in FIG. 4.

FIG. 3 therefore shows the control tube 31 in its one axial end position in which the coaxial valve 10 is closed, while FIG. 4 shows the control tube 31 in its other axial end position in which the coaxial valve 10 is opened.

Figure 5:
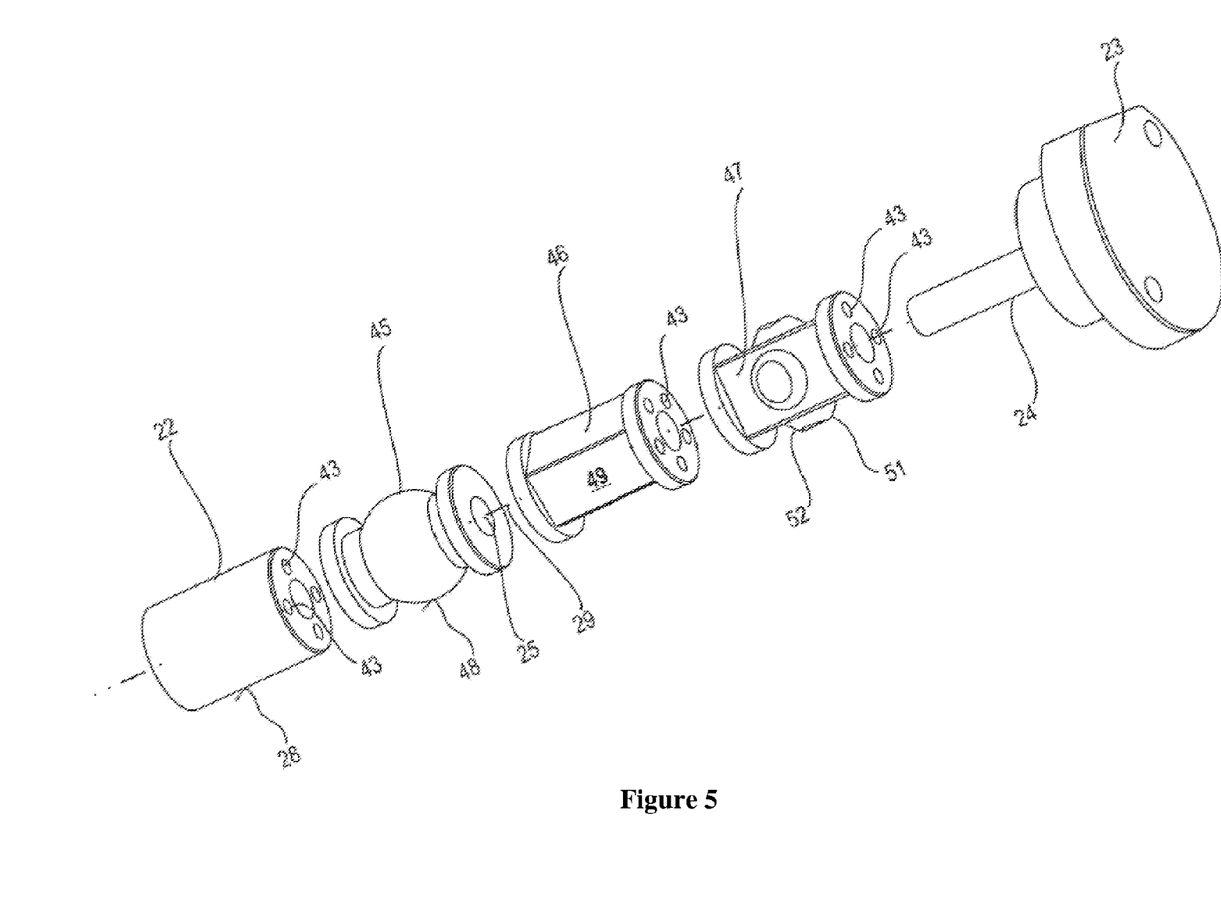
FIG. 5 shows a perspective view of the sealing element holder with four sealing elements which are illustrated in a perspective fashion and which can be optionally fitted onto the supporting bolt of the sealing element holder.

FIG. 5 is a perspective illustration of the sealing element holder 23 with the supporting bolt 24, wherein four different sealing elements 22, 45, 46 and 47, which can be optionally fitted onto the supporting bolt 24, are illustrated along the sealing element axis 29.

The sealing element 22 is the cylindrical sealing element which has already been described and whose cylindrical surface 28 serves directly as a valve seat face in various angular configurations, and for this purpose is provided with five second drilled holes 43.

The sealing element 45 has, as a valve seat face 48, a spherical surface which can in turn interact directly with a front-side end 21, now configured in a circular shape, of the control tube 31 in various angular configurations.

The sealing element 46 has, as a valve seat face, five planar faces. Correspondingly, a total of five second drilled holes 43 are also assigned to the alignment pin 42, which is seated in the sealing element holder 23 and is not shown in FIG. 5, with the result that the sealing element 46 can be plugged onto the supporting bolt 24 in five different angular orientations around the sealing element axis 29.

Finally, the sealing element 47 has, as a sealing element face 51, four truncated cones whose lateral face 52 serves as a valve seat face. Correspondingly, four second drilled holes 43 are provided on the sealing element 47.

It is to be mentioned that all the sealing elements 22, 45, 46, 47 are arranged in a rotationally symmetrical fashion with respect to the sealing element axis 29.

Trials in the applicant's company have revealed that, in particular when the sealing element 45 is used with the spherical surface as a valve seat face 48, the medium 15 flows around the spherical body without a relatively large flow resistance. FIG. 4 shows that the medium 15 which is illustrated by arrows can flow freely into the opening 19, wherein the free space around the sealing element 22 is of such a magnitude there that even relatively small amounts of contamination of the medium 15 do not cause the coaxial valve 10 to become blocked and/or they can be easily removed if the sealing element 22 is removed laterally from the opening 19.

In these trials, a throughflow rate of 3.2 m³/h could be achieved for a control tube 31 with a diameter of 10 mm and a length of 71 mm, while in the case of a prior art coaxial valve 10 which is comparable with the exception of the sealing element 45 and its specific arrangement in the valve housing 11, only a throughflow rate of 2.5 m³/h was achieved. By the way, the theoretical maximum value with a control tube 31 of this type is 4.7 m³/h.

These trials have also revealed that it is advantageous to fabricate the sealing element 22, 45, 46, 47 or the valve seat faces 28, 48, 49, 51 thereof from a material which is slightly softer than the control tube 31, which control pipe as a rule is fabricated from metal. In contrast, plastic has proven favourable for the sealing elements 22, 45, 46, 47. The relatively hard material of the control tube 31 can then slightly penetrate the valve seat face 28, 48, 49, 51 in the course of the switching operations, and can therefore further improve the seal when the coaxial valve 10 is closed. In this way, a coaxial valve 10 seals itself even if there are small uneven portions at the front-side end 21 of the control tube 31 which have been caused, for example, by trapped impurities.

Further trials have shown that a throughflow rate of 9.9 m³/h could be achieved for a control tube 31 with a diameter of 17 mm and a length of 71 mm, while in the case of a comparable prior art coaxial valve 10 which is comparable with the exception of the sealing element 45 and its specific arrangement in the valve housing 11, only a throughflow rate of 8.8 m³/h was achieved for a diameter of 20 mm, of 13.3 m³/h was achieved for a diameter of 25 mm, and of 5.7 m³/h was achieved for a diameter of 15 mm. This clearly shows the superior characteristics of the new coaxial valve.

The invention claimed is:

1. A coaxial valve, comprising:
a valve housing on which an inlet port and at least one outlet port for a medium which is to be conducted through the coaxial valve are provided;
a control tube mounted in the valve housing and having a longitudinal direction, said control tube being movable in its longitudinal direction between a first and a second axial end position within the valve housing and interacting with the inlet port and the outlet port in such a way that when the coaxial valve is in the first axial end position medium flows through the control tube;
at least one valve seat arranged at the housing and having a valve seat face, the control tube interacting with the valve seat face in its second axial end positions in order to close the coaxial valve; and
a control device for moving the control tube between its first and second axial end positions,
wherein the valve seat face is formed on a replaceable sealing element which is arranged in a seat opening of the valve housing, said seat opening running essentially transversely with respect to the longitudinal direction,
wherein at least two valve seat faces are provided on the sealing element, distributed circumferentially around a sealing element axis,
wherein at least one positioning arrangement, which secures at least two circumferential orientations of the sealing element in the valve housing, is provided between the valve housing and the sealing element, and
wherein the positioning arrangement comprises an alignment pin which is securely seated at its one end in a first drilled hole and at its other end interacts with second drilled holes which are arranged distributed around the sealing element axis.

2. The coaxial valve of claim 1, wherein the sealing element is secured to a sealing element holder which is attached in a releasable fashion to the valve housing.

3. The coaxial valve of claim 2, wherein the sealing element is seated, on a supporting bolt, which bolt is arranged in the seat opening and is secured in a releasable fashion at its one end to the valve housing and is attached at its other end to the sealing element holder.

4. The coaxial valve of claim 1, wherein the sealing element is rotationally symmetrical with respect to the sealing element axis.

5. The coaxial valve of claim 1, wherein each valve seat face is formed on a face of the sealing element selected from the group consisting of a cylindrical face, a spherical face, a cone envelope face, and a planar face.

6. The coaxial valve of claim 1, wherein a valve spring is provided, which prestresses the control tube into one of its first and second axial end positions.

7. The coaxial valve of claim 1, wherein the control device comprises an electromagnet, and the control tube is connected to an armature for the electromagnet.

8. The coaxial valve of claim 1, wherein the control device comprises a piston which is activated via a control medium and to which the control tube is secured in the manner of a piston rod.

9. A coaxial valve, comprising:
a valve housing on which an inlet port and at least one outlet port for a medium which is to be conducted through the coaxial valve are provided;
a control tube mounted in the valve housing and having a longitudinal direction, said control tube being movable in its longitudinal direction between a first and a second axial end position within the valve housing and interacting with the inlet port and the outlet port in such a way that when the coaxial valve is in the first axial end position medium flows through the control tube;
at least one valve seat arranged at the housing and having a valve seat face, the control tube interacting with the valve seat face in its second axial end positions in order to close the coaxial valve; and
a control device for moving the control tube between its first and second axial end positions,
wherein the valve seat face is formed on a replaceable sealing element which is arranged in a seat opening of the valve housing, said seat opening running essentially transversely with respect to the longitudinal direction,
wherein the sealing element is secured to a sealing element holder which is attached in a releasable fashion to the valve housing,
wherein at least two valve seat faces are provided on the sealing element, distributed circumferentially around a sealing element axis,
wherein at least one positioning arrangement, which secures at least two circumferential orientations of the sealing element in the valve housing, is provided between the valve housing and the sealing element, and
wherein the positioning arrangement comprises an alignment pin which is secural sealed at its one end in a first drilled hole and at its other end interacts with second drilled holes which are arranged distributed around the sealing element axis.

10. A coaxial valve, comprising:
a valve housing, on which an inlet port and at least one outlet port for a medium which is to be conducted through the coaxial valve are provided;
a control tube which is mounted in the valve housing, said control tube being movable in its longitudinal direction in the valve housing and interacting with the inlet port and the outlet port in such a way that when the coaxial valve is opened medium flows through the control tube;
at least one valve seat having a valve seat face, the control tube interacting with the valve seat face in one of its axial end positions in order to close the coaxial valve; and
a control device for moving the control tube between its axial end positions,
wherein the valve seat face is formed on a replaceable sealing element on which at least two valve seat faces are provided distributed circumferentially around a sealing element axis,
wherein at least one positioning arrangement, which secures at least two circumferential orientations of the sealing element in the valve housing, is provided between the valve housing and the sealing element, and
wherein the positioning arrangement compromises an alignment pin which is securely seated at its one end in a first drilled hole and at its other end interacts with second drilled holes which are arranged distributed around the sealing element axis.

11. The coaxial valve of claim 10, wherein the sealing element is secured to a sealing element holder which is attached in a releasable fashion to the valve housing.

12. The coaxial valve of claim 11, wherein the sealing element is seated on a supporting bolt, which bolt is arranged in the seat opening and is secured in a releasable fashion at its one end to the valve housing and is attached at its other end to the sealing element holder.

13. The coaxial valve of claim 10, wherein the sealing element is rotationally symmetrical with respect to the sealing element axis.

14. The coaxial valve of claim 10, wherein each valve seat face is formed on a face of the sealing element selected from the group consisting of a cylindrical face, a spherical face, a cone envelope face, and a planar face.

15. The coaxial. valve of claim 10, wherein a valve spring is provided, which prestresses the control tube into one of its axial end positions.

16. The coaxial valve claim 10, Wherein the control device comprises an electromagnet, and the control tube is connected to an armature for the electromagnet.

17. The coaxial valve of claim 10, wherein the control device comprises a piston which is activated via a control medium and to which the control tube is secured in the manner of a piston rod.

* * * * *